United States Patent [19]

de Jonge et al.

[11] 3,866,190

[45] Feb. 11, 1975

[54] MAGNETIC DOMAIN PROPAGATION DEVICE

[75] Inventors: Frederik Ate de Jonge; Willem Frederik Druijvesteijn; Antonius Gerardus Hendrikus Verhulst; Ulrich Ernst Enz, all of Emmasingel, Netherlands

[73] Assignee: U.S. Philips Corporation, New York, N.Y.

[22] Filed: Oct. 4, 1972

[21] Appl. No.: 294,909

[30] Foreign Application Priority Data

Oct. 14, 1971 Netherlands ..................... 7114114

[52] U.S. Cl. .................... 340/174 TF, 340/174 SR

[51] Int. Cl. ........................................ G11c 11/14

[58] Field of Search ............................ 340/174 TF

[56] References Cited

UNITED STATES PATENTS

| | | | |
|---|---|---|---|
| 3,540,019 | 11/1970 | Bobeck et al. | 340/174 TF |
| 3,602,911 | 8/1971 | Kurtzig | 340/174 TF |
| 3,638,205 | 1/1972 | Copeland | 340/174 TF |
| 3,728,697 | 4/1973 | Heinz | 340/174 TF |

OTHER PUBLICATIONS

IBM Technical Disclosure Bulletin, Vol. 13, No. 10, Mar. 1971, pg. 3064–3065.

*Primary Examiner*—James W. Moffiti
*Attorney, Agent, or Firm*—Frank R. Trifari; Carl P. Steinhauser

[57] ABSTRACT

A magnetic device comprising at least a thin layer of a magnetisable material which shows an easy axis of magnetisation which extends approximately at right angles to the surface of the layer. Magnetic domains are produced, maintained and, if desireable, destroyed in the layer. A driving force is present for the transport of a domain. An alternating magnetic field having a frequency exceeding that of the driving force is produced at right angles to the plane of the thin layer as a result of which the transport of the domains is facilitated.

3 Claims, 6 Drawing Figures

MAGNETIC DOMAIN PROPAGATION DEVICE

Figure 1:
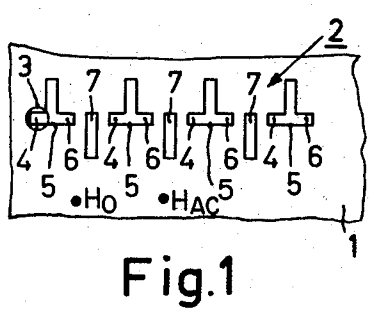

The invention relates to a magnetic device comprising at least one thin layer of a magnetisable material which shows an easy axis of magnetisation which is approximately at right angles to the surface of the layer and further comprising means for producing, maintaining and, if desirable, destroying magnetic domains in said layer.

The rare earth orthoferrites and yttrium orthoferrites and certain ferrites having garnet structure are examples of materials which may be used for this purpose. An external magnetic field $H_o$ the direction of which coincides at least mainly with the said easy axis of magnetisation of the plate serves as a means for producing, maintaining, and, if desirable, destroying the magnetic domains in plates of the said materials. The magnetic domains are, for example, circular-cylindrical and they can exist in a stable form only with magnetic fields $H_o$ the strength of which lies between certain limits. These limit values for the field are inter alia dependent on the thickness of the plate in which the domains occur and on the chemical composition thereof. If the direction of the magnetisation within the domains is directed opposite to the direction of $H_o$ and $H_o$ is varied within the said limits, then the domains decrease when $H_o$ increases and increase when $H_o$ decreases. The domains may alternatively be annular or strip-shaped.

All kinds of proposals have been made to enable the use of such domains. In many cases it comes down to the fact that a domain at a given instant assumes a fixed position in the layer and is then transported, under the influence of certain driving forces, to another fixed position. These driving forces are caused, for example, by means of domain guide structures provided on the layer. In another case the forces are caused by the repelling forces of the walls of the plate. It has been found that for the transport a given minimum value of the driving force must be exceeded. There are cases in which said minimum value cannot be realized. In addition, in other cases the presence of said minimum value for operating the magnetic device is considered to be unfavourable. Actually, should said minimum value be equal to zero, either a larger speed of movement of the domains were to be realized or it would be sufficient to have a smaller driving force.

The invention mitigates this drawback by enabling the use of a smaller driving force. According to the invention, means are present for producing an alternating magnetic field substantially at right angles to the plane of the thin layer having a frequency exceeding the frequency of a driving force present for the transport of a domain.

Under the influence of the alternating magnetic field a reduction occurs of the minimum value of the driving force which is necessary before transport of the domain occurs. Said minimum value can even be reduced to zero. In certain circumstances the additional advantage is present in said latter case that the displacement of the domain is linearly dependent upon the value of the driving force.

The frequency of the alternating magnetic field exceeds the frequency of a driving force present for the transport of a domain. In certain cases this latter may be zero so that in that case any frequency of the alternating magnetic field produces the effect aimed at.

The presence of an alternating magnetic field of a sufficient value in non-homogeneous materials has for its result that, as far as the driving forces and the movement of the domains are concerned, the material behaves in the same manner as a homogeneous material. In a non-homogeneous material the required minimum value of the driving force is not the same everywhere and the alternating magnet field should now be so large that said minumum value is everywhere made zero. This means that in the absence of the driving field the value of the domains is varied in any place in the device under the influence of the alternating magnetic field. According to the invention, in particular the amplitude of the alternating manetic field is therefore so large that under the influence hereof the size of the magnetic domains varies substantially everywhere in the device in the absence of the driving force.

The presence of an alternating magnetic field may moreover result in a reduction of the domain wall damping caused by the magnetisable material. An example is the removal of a diffusion-induced domain wall damping. Therefore, according to the invention, in particular the frequency of the alternating magnetic field is so high that the diffusion-induced domain wall damping is reduced.

Figure 2:
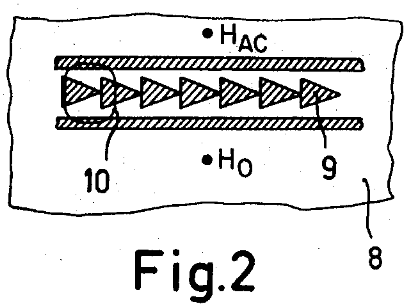
Figure 3A:
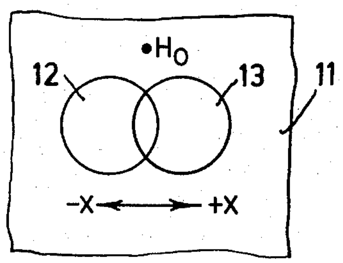
Figure 3B:
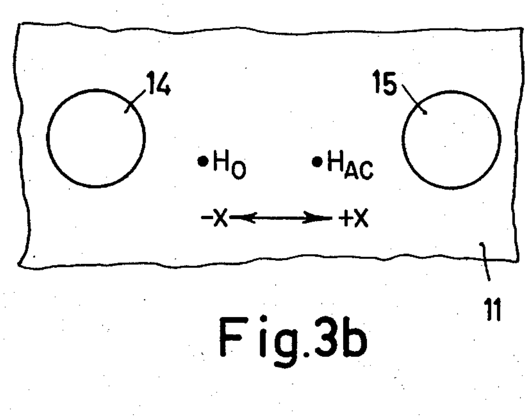
Figure 4:
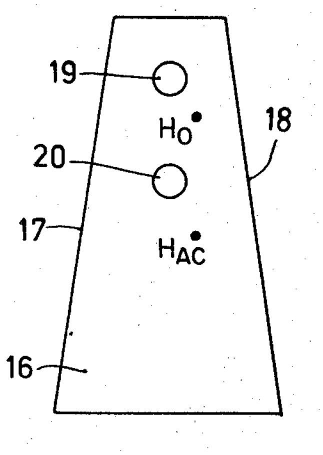
Figure 5:
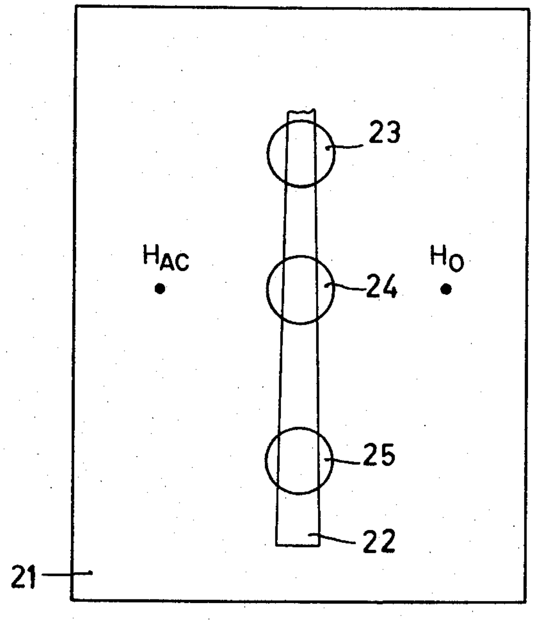

The invention will be described in greater detail, by way of example, with reference to the drawing, in which FIG. 1 shows a magnetic device having a given domain displacement structure, FIG. 2 shows a magnetic device having another displacement structure, FIGS. 3*a* and 3*b* show a magnetic device with displacement of a domain not according to the invention and according to the invention, FIG. 4 shows a magnetic device of a particular shape and FIG. 5 shows a magnetic device having another domain displacement structure.

FIG. 1 shows a part of a plate 1 of a magnetisable material on which a T-bar structure 2 of permalloy is present, along which a magnetic domain 3 is movable by means of a magnetic field rotating in the plane of the plate 1, namely always along poles denoted by 4, 5, 6, 7, 4, 5, . . . . The frequency of the rotating magnetic field is $f$. The domains are produced, maintained and, if desired, destroyed by an external field $H_o$. In order to transport the domains faster, a higher frequency is required. This is restricted, however, to a maximum value determined inter alia by the mobility of the domain walls. An alternating magnetic field $H_{AC}$ is moreover present at right angles to the plate 1 with a frequency exceeding $f$. As a result of this the maximum achievable frequency of the driving field at which transport of the domains occurs with the amplitude of the rotating field remaining the same, becomes larger so that it is possible to transport the domains faster. The frequency of the extra alternating magnetic field is, for example, $2f$. *AC*

FIG. 2 shows a part of a plate 8 of a magnetisable material on which an angelfish structure 9 of permalloy is present. As a result of a magnetic field varying at right angles to the plane of the plate 8 a magnetic domain 10 will move from the left to the right. The frequency of the magnetic field is $f$ while the amplitude which is decisive of the driving force is A. If the material of the plate 8 is homogeneous, the domain is transported as a result of the driving force. Often such a homogeneity of the material cannot be realised so that it can occur that the driving force in a given place is smaller that the required minimum value in said place so that no further transport of the domain occurs. An increase of the amplitude in said place could give a solution, but in other places this might give rise to defective operation of the device. Due to the presence of an extra alternating magnetic field $H_{ac}$ at right angles to the plate with a frequency exceeding *f*, a good operation of the device in all places is achieved. In this case the frequency of the extra field should preferably be larger than 3*f*. The amplitude of the extra magnetic field should be so large that in the absence of the driving field the size of the magnetic domains is varied in any place in the device.

FIG. 3*a* shows a plate 11 of $YbFe0_3$ having a coercive force of 0.39 0e and a thickness of 50 $\mu$. A magnetic field is at right angles to the plate 11. The direction of the magnetic field is always the same but the value hereof varies in time with a frequency of 1000 Hz and is moreover linearly dependent upon the x-coordinate in the plane of the plate ($H = H_o + \alpha$ x sin2 $\pi$ ft). Since the magnetic field depends upon the x-coordinate in the plane of the plate, a driving force with a frequency *f* of 1000 Hz acts upon a magnetic domain. As a result of said driving force, the magnetic domain is moved with said frequency in the direction *x* and $-x$. The extreme positions which are occupied during said movement are shown in FIG. 3*a* and denoted by 12 and 13. The largest distance between the walls is 300 $\mu$. The domain has a diameter of 175 $\mu$. When an alternating magnetic field $H_{AC}$ with a frequency of 5000 Hz and an amplitude of 0.4 0e is applied at right angles to the plate 11, the domain is moved between extreme positions 14 and 15 as is shown in FIG. 3*b*. The largest distance between the walls then is 800 $\mu$. It has been found that in the latter case the largest distance between the walls is linearly dependent on $\alpha$. In the absence of the alternating magnetic field, the said dependence is non-linear. In the presence of the alternating magnetic field, the magnetic domain is transported over a larger distance on the one hand because a larger driving force acts on it and on the other hand because the damping of the movement of the magnetic domain is smaller.

FIG. 4 shows a wedge-shaped plate 16 of a magnetizable material. A magnetic domain present herein in position 19 is moved to position 20 as a result of the repelling forces which the walls 17 and 18 exert on the domain. At that area the resultant of the repelling forces of the walls 17 and 18, however, is not large enough to produce a further transport of the domain. In this case a decreasing driving force acts on the domain with a frequency zero. When an alternating magnetic field $H_{AC}$ having any frequency is applied at right angles to the plate 16, the domain is transported further than position 20 namely dependent upon the value and the number of periods of the alternating magnetic field. Such a wedge is useful upon moving a magnetic domain from a source to, for example, a T-bar movement structure.

An analogous operation occurs in a plate of any shape comprising a wedge-shaped magnetic guiding structure as is shown in FIG. 5. On a plate 21 of $YbFe0_3$ having a coercive force of 0.5 Oe and a thickness of 100 $\mu$, a wedge-shaped magnetic guiding structure 22 of permalloy is present having an apex angle of 1°. If in the presence of an external magnetic field of 34 Oe a magnetic domain having a diameter of 120 $\mu$ is provided at 23, same will move under the influence of the wedge-shaped permalloy structure to position 24 where the width of said structure is approximately 60 $\mu$. If an alternating magnetic field $H_{AC}$ having a frequency of 1 Hz and an amplitude of 2 Oe is applied at right angles to the plate 21, the domain is further transported. After 15 periods the domain has reached 25 and has covered a distance of 350 $\mu$.

What is claimed is:

1. A magnetic device comprising at least one thin layer of a magnetisable material having an easy axis of magnetisation which is approximately at right angles to the surface of the layer, means for producing, maintaining and destroying magnetic domains in said layer, means for producing a driving force having a given frequency for transporting the domains in said layer, and means for producing an alternating magnetic field substantially at right angles to the propagation path having a frequency exceeding the frequency of a driving force present for the transport of a domain.

2. A magnetic device as claimed in claim 1, wherein the amplitude of the alternating magnetic field is so large that under the influence thereof the size of the magnetic domains varies substantially everywhere in the device in the absence of the driving force.

3. A magnetic device as claimed in claim 1 wherein the alternating magnetic field has a frequency at which diffusion-induced domain wall damping is reduced.

* * * * *